United States Patent [19]

Moser

[11] Patent Number: 4,648,176
[45] Date of Patent: Mar. 10, 1987

[54] METHOD AND APPARATUS FOR POSITIONING AND TRANSFERRING STATOR COIL LEADS

[75] Inventor: Keith W. Moser, Roanoke, Ind.

[73] Assignee: Industra Products, Inc., Fort Wayne, Ind.

[21] Appl. No.: 738,871

[22] Filed: May 29, 1985

[51] Int. Cl.[4] ............................................. H02K 15/06
[52] U.S. Cl. .......................................... 29/596; 29/736
[58] Field of Search .................. 29/596, 732, 736, 734

[56] References Cited

U.S. PATENT DOCUMENTS

| | | | |
|---|---|---|---|
| 1,368,683 | 2/1921 | Anderson . | |
| 3,015,875 | 1/1962 | Skuta | 29/155.5 |
| 3,407,469 | 10/1968 | Larsen | 29/205 |
| 3,879,841 | 4/1975 | Mason | 29/596 |
| 4,000,764 | 1/1977 | Reiger | 140/113 |
| 4,106,185 | 8/1978 | Laner | 29/596 |
| 4,215,464 | 8/1980 | Miller | 29/596 |
| 4,294,025 | 11/1981 | Laner et al. | 29/596 |
| 4,428,113 | 1/1984 | Fischer et al. . | |
| 4,449,293 | 5/1984 | Itoh et al. | 29/736 |

Primary Examiner—Carl E. Hall
Attorney, Agent, or Firm—Jeffers, Irish & Hoffman

[57] ABSTRACT

A method and apparatus for positioning and transferring stator coil leads in a dynamoelectric stator assembling machine. The apparatus includes holding devices for positioning and retaining the stator coil leads after the coils are wound and before they are inserted into the stator core. The apparatus also includes lead pullers for transferring the leads, during insertion of the coils into the stator core, from the inserting equipment to a stator carrying pallet having lead retaining devices therein. The apparatus further includes lead catchers for capturing the leads from the stator pallet lead retaining devices and for transferring the leads from the stator pallet to a lead finishing apparatus.

35 Claims, 17 Drawing Figures

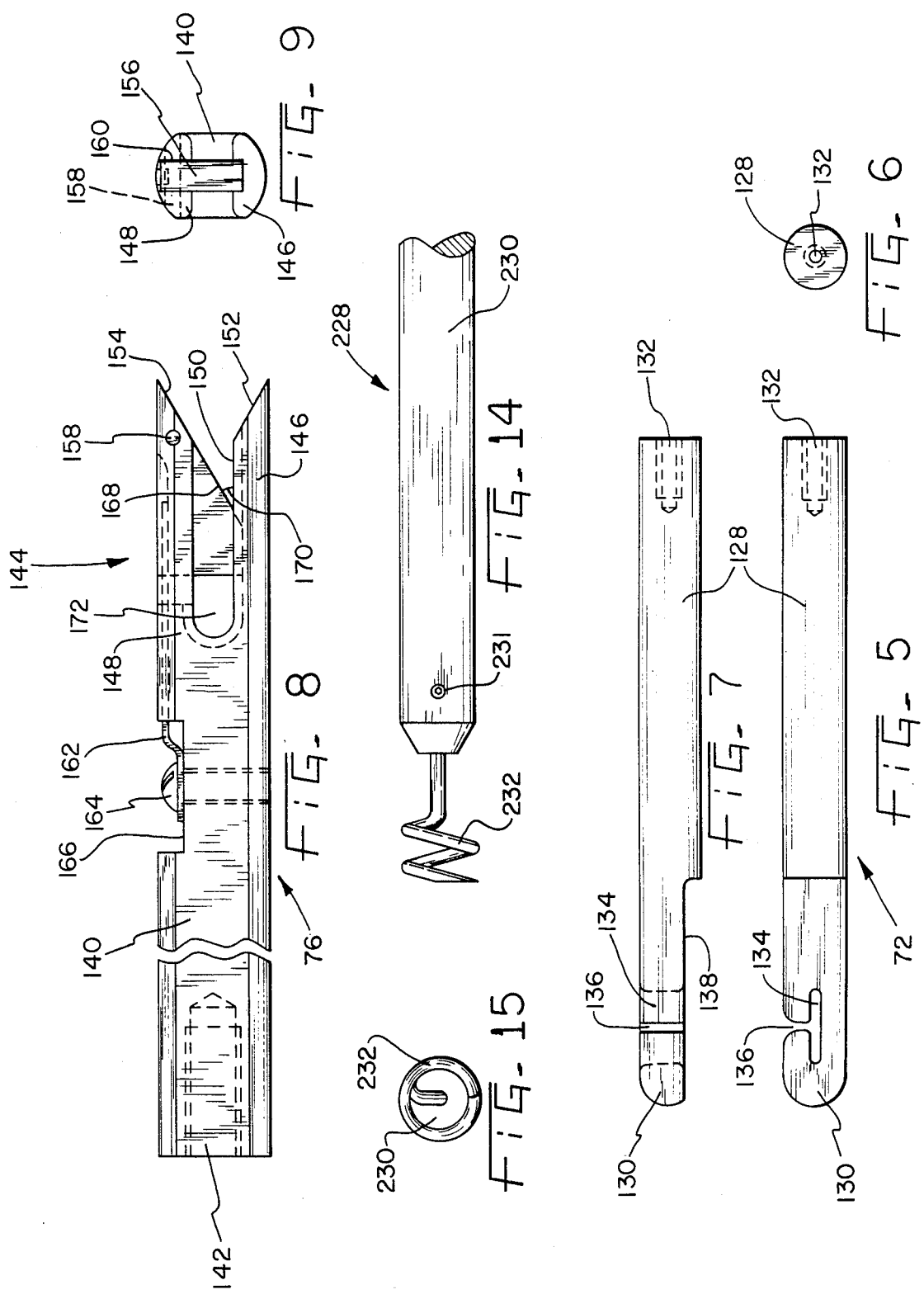

METHOD AND APPARATUS FOR POSITIONING AND TRANSFERRING STATOR COIL LEADS

BACKGROUND OF THE INVENTION

This invention relates generally to coil inserting equipment and more particularly to a method and apparatus for transferring coil beginning and ending wires or leads from retained positions on a coil insertion blade assembly to restraining devices on a stator pallet and from the stator pallet to a coil lead terminating and finishing apparatus.

In the assembly of a dynamoelectic stator and the insertion of prewound coils into the stator core slots the stator coils are generally wound on a coil form. The beginning and ending coil wires or leads are left to hang loose when the wound coils are transferred from the coil winding form to the coil insertion blades for insertion into the stator core slots. Such coils may have as few as two leads, i.e. a beginning and an ending lead, or a much greater number of leads, depending upon the number of poles, the number of windings, the use of interpole wires and the like.

The coil form on which the coils are wound has several sections of increasingly larger diameter and the first coil is generally wound on the smallest coil form section. Coils of increasing size are then wound in succession on the increasingly larger diameter sections. The completed wound coils are stripped from the coil form onto a circular array of insertion blades and are held loosely thereon for insertion by a coil stripper into the stator core together with insulation wedges. The stator core may be held in a stator core carrying pallet during this process. After insertion of the first set of coils into the core additional coils may be wound and inserted into the core if the motor requires more than one winding. When all the coils have been inserted into the stator core, finishing operations are performed on the stator such as drifting and lacing operations.

In prior art coil insertion methods and equipment the coil leads have normally been left hanging loose throughout the coil inserting and finishing operations so that the coil leads must be located and identified prior to performing finishing operations on the leads such as for instance trimming, insulation stripping, and terminal connecting operations. The process for locating and identifying the coil leads for performing the finishing operations thereon has, in prior art processes and equipment, been performed manually which is a cumbersome and time consuming operation. It is therefore desired to provide a method and apparatus for identifying, positioning, retaining and transferring coil leads during the assembly of a stator, whereby the stator coil leads are identified and releasably retained throughout the entire stator assembly process.

Another problem which has been encountered with prior art coil assembly methods and equipment has been that the loose coil leads, during insertion of the coils into the stator core, tend to get caught or tangled in the end turns of the coils or to be caught between successive coil layers, thereby making it necessary to manually locate and extricate the coil leads prior to performing the finishing operations thereon. Additionally, the leads tend to become damaged or broken off during the processing of the stator thereby resulting in defective motors. It is therefore desired to provide a method and apparatus for assembling a stator wherein the coil leads are retained or restrained in retaining devices during assembly of the coils into the stator core whereby the leads are not subject to being caught or entangled in the coils during coil insertion and processing of the stator and being damaged or broken off thereby.

A further problem which has been encountered in the assembly of stator coils into stator cores has been that the leads are not identified throughout the assembly process. Therefore when a finishing operation on the leads is to take place the leads must not only be located but must also be identified to insure that proper circuit connections will be made to the leads. This requires additional time during the assembly process and furthermore is subject to errors on the part of the operator thereby resulting in defective motors. It is therefore desired to provide an apparatus and method for assembling coils into stator cores whereby the coil leads are identified throughout the assembly process thereby reducing the possibility of operator error and the number of defective motors.

Still another problem which has been encountered with prior art methods and equipment for fabricating stators is that, as the stator pallets are being transferred from one operating station to the next on a transfer conveyor, the loose leads tend to get caught in the conveyor mechanism and therefore tend to be damaged or even cut off. It is therefore desired to provide a stator assembly method and apparatus to position the coil leads in retaining devices which are part of the stator carrying pallet during the entire stator assembly process.

A still further problem which has been encountered with prior art stator assembly processes is that partially assembled stators could not be tested since the stator coil leads were not identified and available for testing without manual intervention until the stator has been completely assembled. It is therefore desired to provide a method and apparatus to locate and identify stator coil leads whereby testing of stators can be accomplished throughout the entire stator assembly process.

SUMMARY OF THE INVENTION

The present invention overcomes the disadvantages of the above described prior art stator assembly methods and equipment by providing an improved method and apparatus for assembling a stator.

The present invention comprises a method and apparatus for transferring leads from coil insertion equipment to lead retaining devices connected to the stator carrying pallet.

The present invention also comprises a method and apparatus for transferring coil leads from retaining devices connected to the stator carrying pallet to lead finishing equipment.

The method and apparatus of the present invention comprises positioning devices for releasably holding and positioning leads on the coil insertion equipment, a stator carrying pallet located adjacent the coil insertion equipment and including retaining devices for releasably holding and retaining the coil leads. Lead puller devices transfer the leads from the coil insertion equipment to the pallet retaining devices. The pallet retaining devices are located radially outwardly of the lead carrying slots of the stator core carried by the pallet.

More particularly the invention comprises a stator pallet including lead retaining apertures therein for holding coil leads and a method and apparatus for transferring leads thereto and therefrom. An array of coil insertion blades are located below the pallet and in close proximity thereto with lead positioning or restraining devices secured thereto in alignment with the pallet lead retaining apertures. Lead puller devices are located above the pallet and in alignment with the pallet lead retaining apertures whereby the lead pullers can descend through the lead retaining apertures of the pallet between slot liner cuff supports and be positioned alongside the lead positioning devices. The lead pullers grip the coil leads as the pullers are positioned alongside the lead positioning devices and are then retracted to lace the leads through the pallet lead retaining apertures. The coil leads are then released by the lead pullers so that they are retained and restrained only by the pallet lead retaining apertures. Preferably the movement of the lead pullers occurs during insertion of the coils into the stator core, after the coils have been inserted, and when the coil stripper is at the top of its stroke, just prior to its descent back through the stator core. As the pallet moves from the inserting station to stator finishing stations the leads are securely retained in the pallet lead retaining apertures.

In a further aspect of the invention the method and apparatus comprise a lead finishing station including lead catchers which have spiral devices at the lead receiving ends thereof and which are rotatable and axially movable to grip the leads. The lead catchers move downwardly to lace the leads through lead finishing equipment whereby the leads can be finished and have terminating connections made thereto.

One advantage of the method according to the present invention is that coil leads are identified and retained in predetermined retaining devices throughout the coil inserting and stator finishing operations whereby the prior art manual operations for identifying and locating the leads after the stator has been completely assembled are no longer necessary.

Another advantage of the present invention is that the possibility of damage to the coil leads is eliminated both during insertion of the coils into the stator core, during insertion of additional coils into the stator core and throughout the movement of the stator carrying pallet through the coil assembly stations.

An additional advantage of the present invention is that the coil leads are restrained in the coil carrying pallet throughout the assembly process thereby minimizing the number of required lead transfer operations.

Yet another advantage of the present invention is that the need to manually extricate coil leads from the stator assembly at the end of the inserting operation is eliminated thereby further reducing the possibility of damage to the coil leads and shortening equipment cycle time.

A further advantage of the present invention is that by positively positioning and identifying stator coil leads the possibility of incorrect assembly and circuit interconnection of the stator coils is reduced thereby improving product quality.

A still further advantage of the present invention is that the lead finishing and terminating procedures according to the present invention can be automated thereby reducing labor cost and improving cycle time of the equipment.

A yet further advantage of the present invention is that the stator assembly can be tested at various points during the assembly process because the leads are accessible and identified thereby permitting detection and scrapping of defective stator assemblies early in the stator assembly process.

A further additional advantage of the present invention is that the apparatus and method are universally applicable to the assembling process of stators with a variety of wire sizes, numbers of poles and windings, and coils which are wound in different directions and having different stack heights.

The invention, in one form thereof, provides a method for positioning and releasably retaining coil terminating leads during the assembly of prewound coils into a stator core. The method comprises providing a pallet for carrying the stator core, inserting the prewound coils into a stator core and retaining the coil leads in restraining devices secured to the pallet.

The invention, in one form thereof, further provides an apparatus for inserting prewound coils into the slots of a stator core, the slots including at least one coil terminating wire lead. The apparatus includes coil placer tooling for inserting the coils into the stator core, and a pallet for supporting the stator. An assembly is provided for transferring the lead from a predetermined position on the placer tooling to a lead retaining aperture in the stator core pallet. The assembly comprises a lead holder mounted on the placer tooling for positioning the lead prior to insertion of the coils into a stator core and a lead puller for transferring the lead from the lead holder to the retaining aperture.

The invention, in one form thereof, still further provides an apparatus for inserting prewound coils into the slots of the stator core of a dynamoelectric machine, the coils including a plurality of terminating wire leads. The apparatus includes coil placer tooling for inserting coils into the stator core slots and for receiving coils from a coil winding form. The placer tooling includes inserting blades and a stripper for stripping coils from the blades and for inserting the coils into the slots. The apparatus further includes an assembly for retaining coil leads in predetermined positions on the placer tooling and comprising a wire holding member including a slot for releasably retaining the leads therein. A stator supporting assembly is provided which includes lead retaining apertures axially aligned with the holding members. A lead transfer assembly is provided which comprises lead pullers for gripping the leads retained in the slot for lacing the leads through the lead retaining apertures.

The invention, in one form thereof, additionally provides an apparatus for inserting prewound coils into the slots of the stator core of a dynamoelectric machine, the coils including a plurality of terminating wire end leads. The apparatus includes coil placer tooling for inserting the coils into the stator core slots and for receiving prewound coils which are to be inserted into the stator core. An assembly for positioning and transferring leads is provided and which comprises a stator core supporting tray and retaining devices for releasably retaining the coil leads. Devices are provided operatively associated with the placer tooling for receiving and retaining the leads in predetermined positions prior to insertion of the coils into the stator core slots. Lead puller devices are also provided for transferring leads from the predetermined positions to the stator core tray retaining devices during insertion of the coils into the stator core slots and lead catchers are further provided for transferring the leads from the stator core tray retaining devices to coil lead processing means.

The invention, in one form thereof, yet further provides a method for transferring coil leads from predetermined positions in a coil inserting apparatus to retaining devices located on a stator carrying pallet. The coil inserting apparatus includes coil placer tooling for inserting coils into a stator core and has an array of coil inserting blades and a coil stripper. The method comprises the steps of supporting prewound coils on the blade array, positioning the leads into predetermined positions on the placer tooling and then moving the blades into their coil inserting positions. The coil stripper is then advanced through the blade array to strip the coils into predetermined core slots and the leads are gripped and transferred to the retaining devices after the coils have entered the slots and prior to retraction of the stripper and the blades to their preinserting positions.

The invention, in one form thereof, also provides a method for positioning and transferring the leads of prewound coils in a coil inserting apparatus. The apparatus includes a blade support, an array of inserting blades mounted thereon, a stripper, lead holders secured to the blade support for holding coil leads in predetermined positions and a stator support tray including lead retaining apertures therein. The apertures are aligned with the holders and lead pullers are provided for gripping and pulling the leads through the lead retaining apertures. The pullers are also aligned with the apertures and the holders. The method comprises the steps of placing the prewound coils on the blade array and positioning the coil leads in the holders. The lead pullers are lowered through the apertures and are positioned adjacent the holders for gripping the positioned leads therewith. The pullers are retracted through the apertures with the gripped leads and the leads are laced through the apertures. The pullers are then returned to their rest positions to enable the leads to be released from the pullers and the pallet is then moved with the retained leads to a subsequent station for further operations.

The invention, in one form thereof, provides an apparatus for processing the coil termination leads of a dynamoelectric machine stator, the stator being supported in a pallet which includes devices for retaining the leads. A lead transfer apparatus is provided for transferring the leads from the retaining devices to an assembly which performs finishing operations on the leads. The transfer apparatus comprises movable lead catchers for catching and retaining the leads and for transferring the leads away from the pallet to a lead finishing apparatus for performing a finishing operation on the leads.

The invention, in one form thereof, still further provides an apparatus for processing coil terminating leads of a dynamoelectric machine stator core. An assembly is provided for retaining and transferring the leads to a lead finishing apparatus. The assembly comprises lead catchers devices and a stator support pallet, which includes lead retaining apertures. The lead catchers devices each include an axially movable elongated body having a lead catcher at one end thereof and movable between a rest position and a lead catching position wherein the lead catcher is positioned adjacent a retaining aperture to catch a lead. A lead finishing assembly is positioned intermediate the rest position of the lead catcher device and the pallet whereby the lead catcher transfers the lead from the pallet retaining aperture to the lead finishing assembly as it retracts from the catching position to a rest position.

The invention, in one form thereof, yet still further provides a method for transferring coil leads from a partially assembled dynamoelectric stator core to a lead finishing assembly in an apparatus for assembling coils into a stator core. The apparatus includes a stator pallet having lead retaining devices thereon and a lead capturing devices for catching leads. The lead capturing device is movable between the lead finishing assembly and the pallet. The method comprises the steps of moving the lead capturing device adjacent the lead retaining device in the pallet, capturing the lead and retracting the capturing device to a transferring position adjacent the lead finishing assembly and transferring the lead.

It is an object of the present invention to provide a method and apparatus for positioning and retaining coil leads on an insertion blade assembly and for transferring the leads from the insertion blade assembly to restraining devices in a stator core carrying pallet whereby the leads are restrained and identified throughout the stator assembling process.

An additional object of the present invention is to prevent damage to stator coil leads both during insertion of the coils into the stator core and during insertion of additional coils into the stator core.

Another object of the present invention is to prevent damage to stator coil leads during the transfer of the stator pallet from one station to another station.

Yet another object of the present invention is to eliminate the need for locating and identifying stator coil leads after assembly of coils into a stator core and prior to the lead finishing operations.

A further object of the present invention is to provide a method and apparatus for assembling a stator wherein errors in manually identifying and terminating and connecting coil leads are eliminated.

Still another object of the present invention is to provide a method and apparatus for assembling stator coils into a stator core wherein the lead finishing operations can be automated.

A further additional object of the present invention is to provide a method and apparatus for handling stator coil leads whereby partially assembled stators can be tested throughout the stator assembling process.

A yet further object of the present invention is to provide a universal method and apparatus for positioning, transferring, locating and identifying stator coil leads during the assembly of a stator.

BRIEF DESCRIPTION OF THE DRAWINGS

The above mentioned and other features and objects of the invention, and the manner of obtaining them, will become more apparent and the invention itself will be better understood by reference to the following description of an embodiment of the invention taken in conjunction with the accompanying drawings wherein:

FIG. 5 is an elevational view of a lead holder;

FIG. 6 is an end view of the lead holder of FIG. 5;

FIG. 7 is a side view of the lead holder of FIG. 5;

FIG. 8 is an elevational view of a lead puller;

FIG. 9 is an end view of the lead puller of FIG. 8;

FIG. 14 is an elevational view of a lead catcher;

FIG. 15 is an end view of the lead catcher of FIG. 14;

Corresponding reference characters indicate corresponding parts throughout the several views of the drawings.

The exemplifications set out herein illustrate a preferred embodiment of the invention, in one form thereof, an such exemplifications are not to be construed as limiting the scope of the disclosure or the scope of the invention in any manner.

DESCRIPTION OF THE PREFERRED EMBODIMENTS

Figure 1:
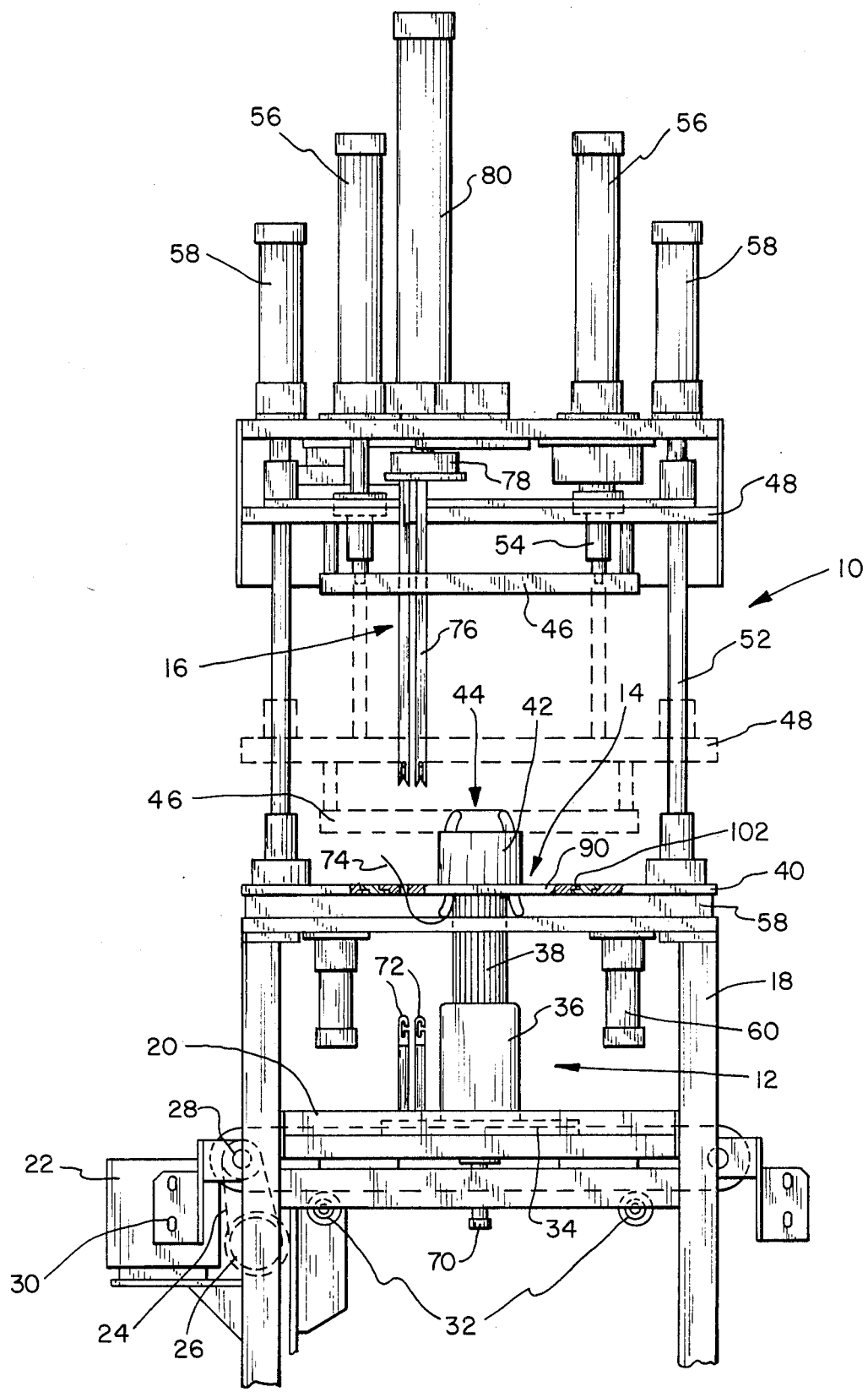
FIG. 1 is an elevational view of the coil inserting station of the stator assembly apparatus including the lead positioning and lead puller assemblies.

Referring to FIG. 1 what is disclosed is a coil inserting apparatus 10 comprising placer tooling 12, a stator carrying pallet assembly 14 and a lead puller assembly 16. The entire apparatus is supported by a conventional support frame 18. A conveyor 20 supports the placer apparatus 12 and moves the placer apparatus to and from the coil inserting apparatus shown in FIG. 1. A conveyor drive motor 22 drives the conveyor belt, the drive motor being supported by a bracket 30 which is secured to frame 18. The drive motor drives a pulley 26 for driving a chain 24 which is in driving engagement with conveyor pulley 28. Conveyor 20 also includes conveyor rollers 32 for supporting the conveyor belting.

The placer apparatus is supported by a placer support pallet 34 which in turn supports placer support 36 for supporting the coil inserting blades and wedge guides. The placer apparatus and its manner of operation for inserting coils and insulating wedges into the stator core slots is conventional and is more fully described in the prior art patents such as for instance U.S. Pat. No. 4,455,743 which is assigned the same assignee as the present invention and which is incorporated herein by reference. The apparatus for driving the coil and wedge inserting equipment is not shown in FIG. 1 since such apparatus is conventional and forms no part of the present invention.

Continuing now with FIG. 1, stator pallet nest 40 is shown for supporting stator pallet assembly 14 and stator core 42 as more fully described hereinafter. Coils 44 are shown in their inserted positions. An upper cuff support assembly 46 and a lower cuff support assembly 50 are shown for respectively supporting the upper and lower slot liner cuffs during coil insertion. A telescoping upper core clamping assembly 48 is provided for clamping the core in the inserting apparatus in a conventional manner.

Upper cuff support assembly 46 is attached to clamping assembly 48 and is telescopingly movable downwardly with clamping assembly 48 into its coil inserting position as shown in dashed lines wherein upper cuff support assembly 46 clamps stator 42. A plurality of power cylinders is shown in the upper portion of the coil inserting apparatus for selectively driving the various parts of the equipment. Thus cylinders 56 are provided for driving clamping assembly 48 and the upper cuff support assembly 46 downwardly. Cylinders 58 are provided for driving the stator pallet nest 40 downwardly. Two cylinders 60 are shown located below the lower cuff support assembly 50 for moving the lower cuff support assembly 50 upwardly to allow another upper placer apparatus 12 to be positioned and for moving lower cuff support assembly 50 downwardly when a stator core is loaded to achieve cuff supporting engagement with the stator core during the core inserting operation cuff supporting engagement with the stator core during the coil inserting operation.

Continuing further with FIG. 1, the driving assembly in the area of locating shot pin 70 for driving the inserting blades, wedge pusher, and stripper during the coil inserting operation of the equipment is not shown and is of conventional design and forms no part of the present invention. Lead holders 72 are provided for positioning and retaining coil leads 74 during the coil inserting operation until lead pullers 76 grip and transfer leads 74 and cause them to be released by lead holders 72. Lead wire pullers 76 are secured to lead puller holder 78 which is driven by cylinder 80 to cycle the lead pullers and transfer leads 74 as further explained hereinafter.

Figure 3:
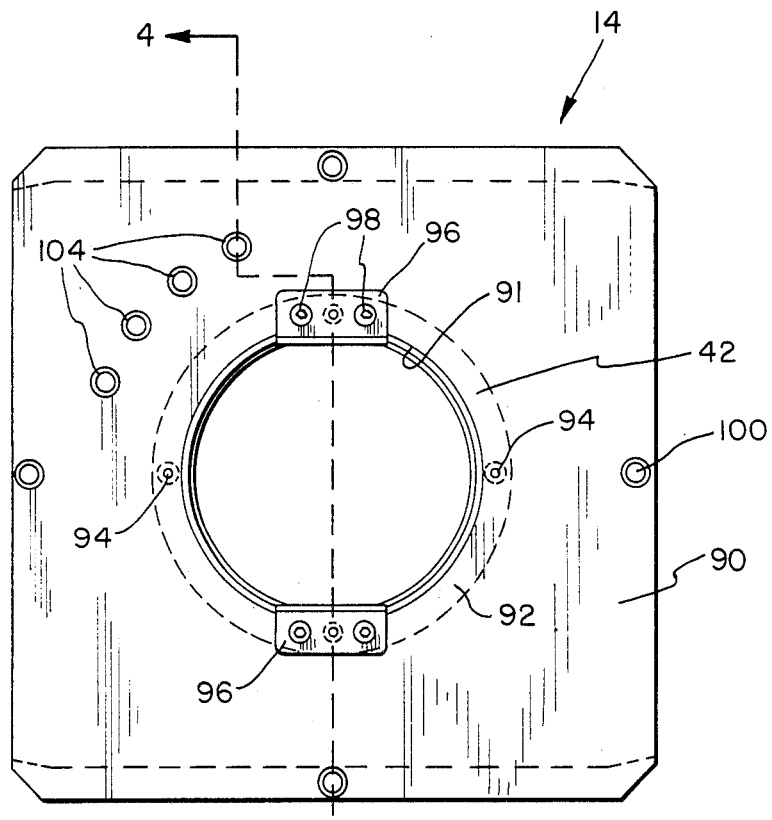
FIG. 3 is a plan view of a stator pallet.
Figure 4:
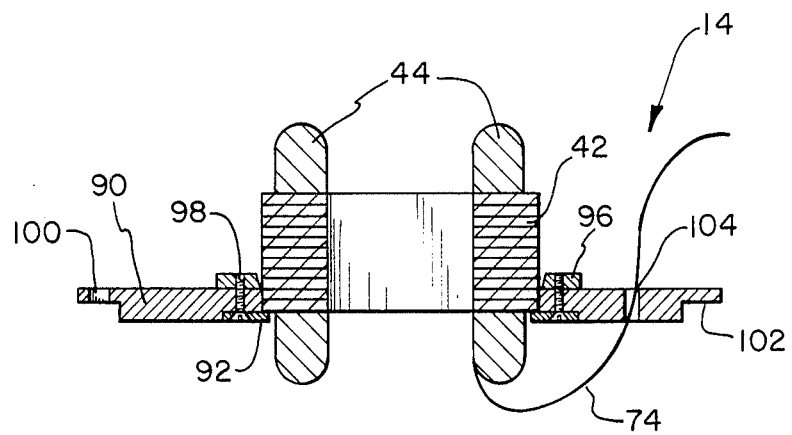
FIG. 4 is a sectional view of the stator pallet and stator assembly taken in the direction of arrows 4—4 of FIG. 3.

Referring now to FIGS. 3 and 4 the stator pallet assembly 14 is disclosed including stator pallet 90 and stator support ring 92. The stator pallet assembly 14 is more fully disclosed in copending U.S. patent application Ser. No. 738,867 which is incorporated herein by reference and which was filed on an even date herewith and is assigned to the assignee of the present invention.

Stator pallet 90 includes a bore 91 into which a stator core 42 is inserted. Stator support ring 92 is secured to stator pallet 90 by means of fasteners 94, four of which are shown and supports stator core 42 with inwardly extending lips as shown. Stator retainers 96 are also provided and are secured to the pallet by means of fasteners 98. The retainers engage a pair of flats formed on two sides of stator core 42 for preventing the stator from rotating. Locating holes 100 are provided in stator pallet 90 for locating the pallet in the inserting equipment and in subsequent stator finishing stations. A pair of shoulders 102 is provided on pallet 90 for engaging mating flanges on stator pallet nest 40. Coil lead retainer apertures 104 are provided in pallet 90 for retaining coil leads 74 as more fully explained hereinafter. In the disclosed embodiment four retainer lead apertures 104 are shown although a greater or smaller number of apertures could be provided, depending upon the application of the particular stator core pallet.

Lead retaining apertures 104 are located radially outwardly of and in alignment with the lead retaining slots of the stator core wherein coil leads 74 are located and restrained. By locating lead retaining apertures 104 in alignment with the slots of the stator core the retained coil leads will run between the cuff supports 190 and the coil leads will not need to cross cuff supports 190 which allows the use of a full compliment of these cuff supports and prevents possible damage to the slot liner cuff material 192.

While lead retaining apertures 104 are shown located in the same quadrant of pallet 90, they could be located in any convenient location of pallet 90 as desired for ease in assembling the stator.

It should also be understood that lead retainer devices other than apertures 104 could be provided such as for instance coil lead retainer clips which could be secured to stator core pallet 90.

FIG. 4 shows only one lead 74 retained in lead retaining aperture 104. However, it should be understood that leads can be retained in each of a plurality of lead retaining apertures 104. Alternatively several leads 74 may be retained in one aperture 104. Leads 74 are therefore releasably retained or restrained in apertures 104.

It should also be understood that, while lead 74 is shown laced upwardly through aperture 104, other arrangements are possible, for instance leads 74 could be laced downwardly through apertures 104.

Figure 2:
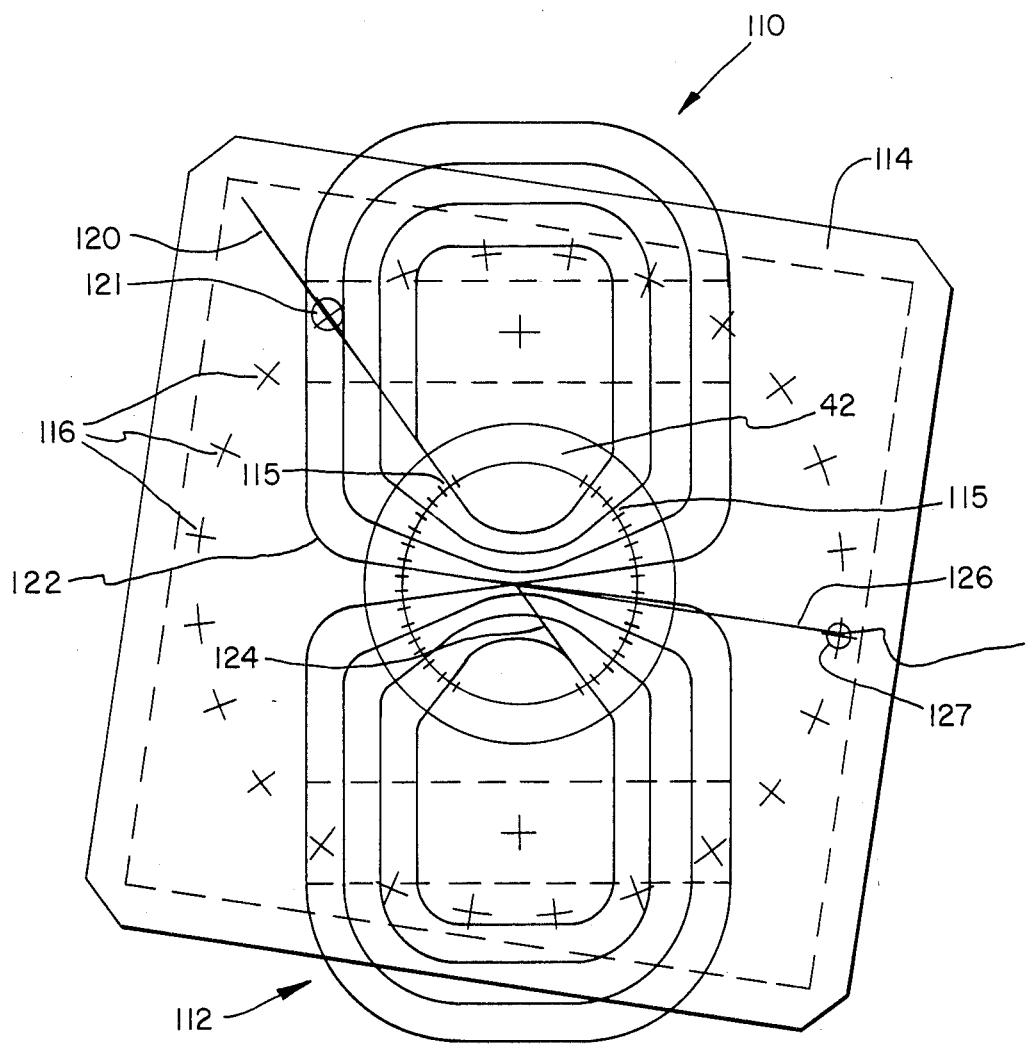
FIG. 2 is a diagrammatic plan view of the windings for a two pole motor.

Turning now to FIG. 2, a diagrammatic representation of a two pole winding is shown with the first pole winding indicated at 110 and the second pole winding indicated at 112. This diagrammatic representation is a plan view of the coils with the coils shown located prior to their insertion into the stator core slots. Outline 114 indicates the position of pallet 90 with two lead retaining apertures 121 and 127 matching up with two of the cross marks 116. The location of the stator coil slots with respect to the windings is shown schematically at 115. The direction in which the coil leads 74 should run is indicated to be from coil slot locations 115 to marks 116.

Figure 10:
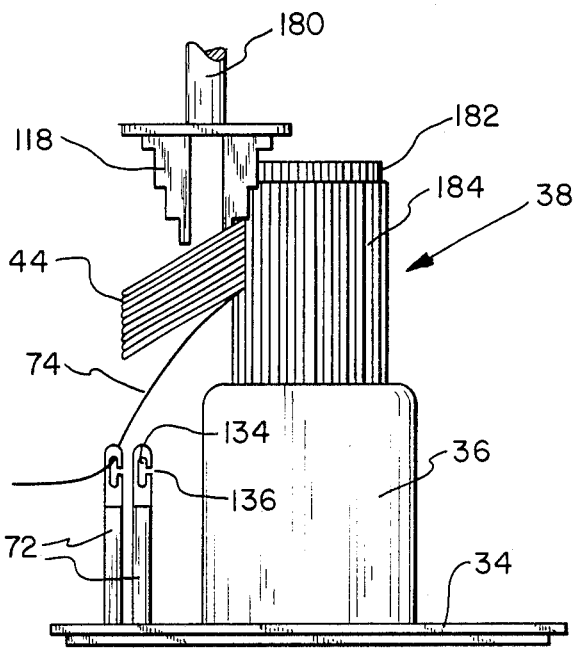
FIG. 10 is an enlarged broken-away view of the coil form and placer tooling of the apparatus after the wound coil has been stripped from the coil form onto the coil insertion blades.

As is well known, coils are generally wound on a coil form 118 such as illustrated in FIG. 10. The coil form usually is a stair stepped structure so that one coil is wound on each of the stair step portions of coil form 118. The coils are wound by first winding the smallest coil, then the next larger coil and so forth until the largest coil is wound. The beginning lead wire for the two pole winding of FIG. 2 is indicated at 120 adjacent retaining aperture 121 and the ending wire for the largest coil of pole winding 110 is indicated at 122. Rather than cutting wire 122 after pole winding 110 is wound, prior to winding the pole winding 112, an interpole wire 124 runs directly from the largest coil of pole winding 110 to the smallest coil of pole winding 112 as indicated. The ending wire or lead of the largest coil of pole winding 112 is indicated at 126 adjacent retaining aperture 127. Thus pole windings 110 and 112 are connected by means of interpole connecting wire 124. It should also be noted that the coils are aligned with the slot locations 115 of stator core 42 as indicated.

Referring now to FIGS. 5, 6, and 7 there is shown a lead holder 72 having a cylindrical elongated body 128 including an upper lead holding end 130 and a lower end including a threaded aperture 132 for receiving a threaded fastener to secure lead holder 72 to placer tooling pallet 34. The upper lead holding portion 130 includes a longitudinal lead holding slot 134 and a transverse lead inserting slot 136. It is therefore possible to insert a wire into transverse slot 136 and then to move the wire upwardly or downwardly into the longitudinal slot 134 whereby the wire is releasably captured and retained in lead holder 72. A recessed surface 138 is also provided at the upper lead holding end 130 of lead holder 72 for cooperating with a lead puller 76 so that the lead puller can slide alongside lead holder 72 to grip coil leads 74 and transfer them as further described hereinafter. It should be understood that, while in the illustrated embodiment lead holder 72 is shown as holding only one lead, a plurality of leads 74 may be held and transferred at the same time.

Referring now to FIGS. 8 and 9 a lead puller 76 is disclosed including a longitudinal generally rectangular body 140 having a threaded opening 142 in the lower end thereof for securing the lead puller to lead puller holder 78. A jaw assembly 144 is also shown including stationary jaw members 146 and 148 which form a slot 150 therebetween. Stationary jaw member 146 and 148 include inwardly angled surfaces 152 and 154 respectively. The angled surfaces 152 and 154 angle inwardly toward slot 150 to aid in guiding leads into slot 150. A movable jaw member 156 is shown which is disposed in slot 160 of stationary jaw member 148 and is secured to jaw member 148 by means of pivot pin 158. Movable jaw member 156 is therefore pivotable about pin 158 in slot 160. A leaf spring member 162 is secured in recess 166 of lead puller longitudinal body 140 by means of a threaded fastener 164. By providing a recess 166 for the head of fastener 164 the outer surface of lead puller longitudinal body 140 is maintained generally streamlined to enable it to move through stator pallet lead retaining apertures 104 without catching. Spring 162 urges movable jaw member 156 into its closed position as illustrated whereby movable jaw member 156 closes off slot 150 to form wire holding aperture 172. Movable jaw member 156 includes an inwardly angled surface 168 which forms an acute angle 170 with the inwardly facing surface of stationary jaw member 170. Surface 168 of lead puller 76 will therefore guide leads 74 inwardly into slot 150. Upon further movement of the lead puller toward a lead, pivotable jaw member 156 will pivot outwardly about pin 158 out of slot 150 thereby allowing lead 74 to enter into aperture 172 of slot 150. Movable jaw member 156 is then urged back to its closed position by spring 162 and captured lead 74 is retained in aperture 172.

Referring now to FIG. 10 the operation of the lead positioning apparatus is as follows. After coils 44 are wound on coil form 118 at a coil winding station the coil form is positioned adjacent the coil insertion blade and wedge guide assembly 38 of placer tooling 12. Coil form 118 is driven by means of drive shaft 180. Coils 44 are then stripped from coil form 118 onto coil insertion fingers or blades 182 which are shown in their retracted or coil receiving positions. The coils extend outwardly of blades 182 through gaps between wedge guides 184. While coils 44 are in this position an operator manually positions coil leads 74, only one of which is shown in this illustration, into lead holders 72. The coil lead 74 is threaded through transverse slot 136 and into longitudinal slot 134 whereupon coil lead 74 will be retained securely by lead holder 72. Coil 44 is therefore now held only by coil inserting blades 182 and leads 74 will be restrained by lead holders 72 attached to placer tooling pallet 34. Coil placer tooling 12 including coil placer pallet 34 is now transferred by means of conveyor 20 to the coil inserting station. During this transfer leads 74 will be securely retained by lead holders 72 so that the leads will not dangle loosely and possibly be damaged during the transfer by conveyor 20. While only two coil holders 72 are illustrated it should be understood that more or fewer coil holders could be readily provided depending on the number of leads 74 to be handled.

Figure 11:
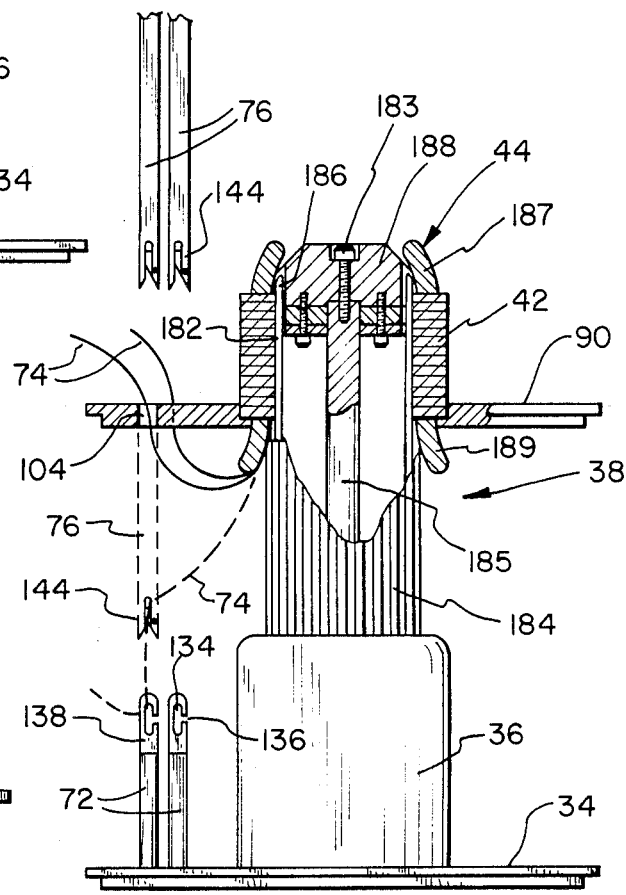
FIG. 11 is a enlarged broken-away view partly in cross section of the placer tooling during insertion of the coils into the stator and with the lead pullers positioned to lace the coil leads through the stator pallet lead retaining apertures.

Referring now to FIG. 11 the operation of the coil lead transfer assembly 16 including lead pullers 76 is as follows. A stator pallet 90 including lead retaining apertures 104 and carrying a stator core 42 is positioned adjacent coil placer tooling 38 with the stator core resting on wedge guides 184 and with the bore of stator core 42 aligned precisely with the insertion blades 182. At this time coils 44 are held only by insertion blades 182 as shown in FIG. 10. The coil insertion operation now begins with the upward movement of coil insertion blades 182 into the bore of stator core 42. Insertion blades 182 will move upwardly until the tips 186 of insertion blades 182 extend just above stator core 42 into their coil insertion positions as shown. In this position blade tips 186 protect upper coil end turns 187 from damage by the sharp edges of core 42 during insertion. A stripper member 188, which is secured to a drive shaft 185 by fastener 183, now moves upwardly into the bore of stator core 42 to strip coils 44 from fingers 182 and insert coils 44 outwardly into slots of stator core 42. After coils 44 are inserted into slots 194 of stator core 42, stripper member 188 is retracted out of stator core 42. When stripper 188 is at the top of its insertion stroke just prior to its retraction out of stator core 42 lead pullers 76 are stroked downwardly through lead retaining apertures 104 and are positioned along the flat recessed surfaces 138 of lead holders 72. This movement will cause leads 74 to be guided inwardly by jaw surfaces 152, 154 and 168 into slot 150 and toward acute angle 170 formed by moveable jaw member 156 and the slot facing surface of stationary jaw member 146. Moveable jaw member 156 is therefore pivoted outwardly in slot 160 against the biasing force of spring 162 thereby causing leads 74 to enter aperture 172 of slot 150 and to be captured therein as moveable jaw member 156 snaps outwardly to close off slot 150. Thereafter lead pullers 76 will be retracted upwardly and in so doing will cause leads 74 to be pulled out of slots 134 and to be released from lead holders 72. As lead pullers 76 retract upwardly through apertures 104 of pallet 90, leads 74 will be laced through apertures 104. As lead pullers 76 retract even further upwardly leads 74 will slip out of apertures 172 of lead pullers 76 and will be released thereby so that they are retained only by retaining apertures 104 in pallet 90. The dashed line representation of lead pullers 76 in FIG. 11 shows lead puller 76 after it has begun to move upwardly after having captured leads 74 from lead holders 72.

It is important that the operation of lead pullers 76 is timed to coincide with the insertion of coils 44 into stator core 42, since it is desired not to use any more apparatus cycle time than is necessary. By operating lead pullers 76 during the insertion operation, no additional cycle time will be needed. Furthermore, it is important that lead pullers 76 transfer leads 74 after coils 44 are seated in slots 194 of stator core 42 because, in that position, coils 44 will be retained securely in slots 194 so that the tugging of lead pullers 76 on leads 74 will not cause excess wire to be pulled from coils 44 and thereby cause deformation of coils 44. It has been found that the best time for performing the lead transfer operation is when the stripper is at the very top of its injection stroke when all the coil wire has reached home in core slots 194.

It should also be understood that, while only two leads 74, two lead pullers 76 and two lead holders 72 are shown, this is done for illustrative purposes only. The number of lead pullers 76 and lead holders 72 could be increased to handle any number of leads 74. Furthermore, while only one lead 74 is shown being transferred by each lead puller 76, several leads 74 may be transferred by each lead puller 76 to be simultaneously laced through each lead retaining aperture 104 of pallet 90.

Figure 12:
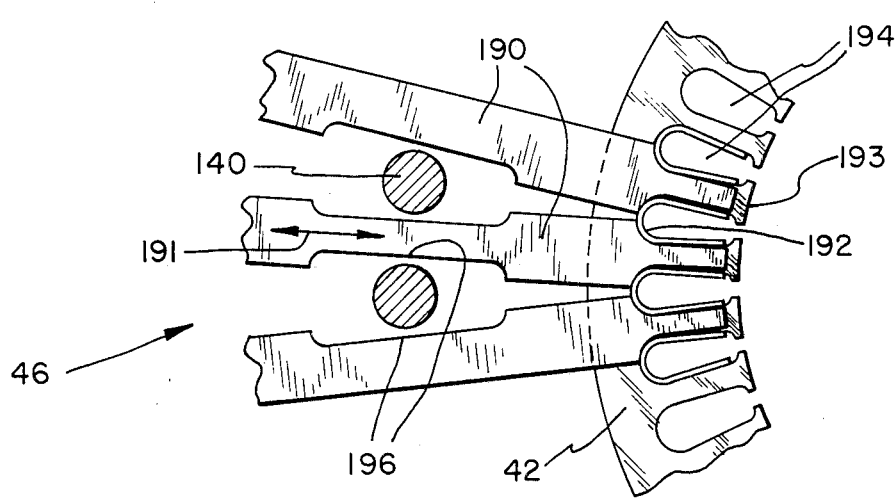
FIG. 12 is a partial broken away plan view of the stator core and cuff supports during the lead transfer operation.

Referring now to FIG. 12 there is shown a broken away plan view of a section of the upper cuff support assembly 46. Cuff support fingers 190 slide inwardly in the direction of arrow 191 toward stator core slots 194 in a conventional manner to support cuffs 192 of slot liners during assembly of the coils into stator core 42. Lead pullers 76, which have generally streamlined smooth longitudinal bodies 140, must be able to move upwardly and downwardly through cuff support fingers 190 without interference. As shown in FIG. 12, recesses 196 are provided in fingers 190 to permit lead pullers 76 and longitudinal bodies 140 thereof to move unhindered in the longitudinal apertures provided by recesses 196. The longitudinal recesses permit axial movement of fingers 190. A similar recess arrangement is provided for lower cuff support assembly 50 as lead pullers 76 must pass through both the upper and lower cuff support assemblies 46 and 50 during the lead transfer operation.

It should be noted that lead pullers 76 should be aligned with lead retaining apertures 104 and lead holders 72. In the illustrated embodiment lead pullers 76 and holder 72 would be arranged in a circle to coincide with apertures 104 as best shown in FIGS. 2 and 3.

Figure 13:
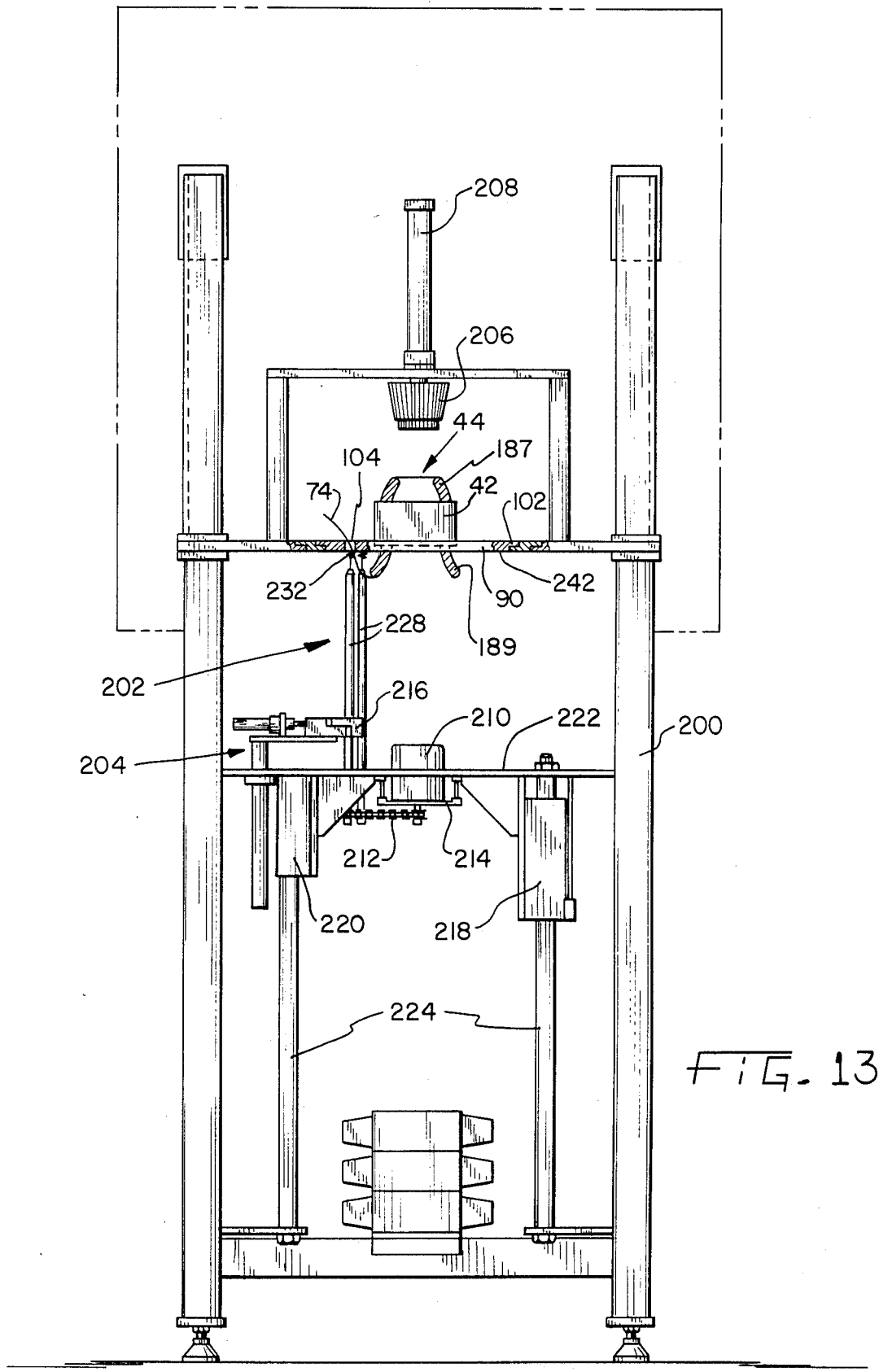
FIG. 13 is an elevational view of the lead finishing station including the lead catcher assembly.

Referring now to FIG. 13 there is shown a coil end turn and lead finishing apparatus including a frame 200, a lead catcher assembly 202 and a lead cutting assembly 204. Stator pallet 90 has now been transported from the coil inserting station illustrated in FIG. 1 to a lead finishing station shown in FIG. 13.

Coil leads 74 are now retained in lead retaining apertures 104 of stator pallet 90 as explained hereinabove. Coils 44 have been inserted into stator core slots 194 and coils 44 are in condition for finishing operations such as the lead trimming and terminal connecting operations. Movable conical plug 206, which is driven by plug cylinder 208, is positioned above stator core 42 and is aligned with the bore of stator core 42. Plug 206 may be lowered into the stator core bore to put pressure on the coil top end turns 187 so that, when leads 74 are transferred from stator pallet retaining apertures 104 to the lead trimming assembly 204 by means of lead catcher assembly 202, no wire is pulled out of coils 44 and the desired coil shape is retained. The use of plug 206, which may be constructed of metal, plastic or nylon and the like, therefore prevents the lead catcher assembly 202 from pulling excess wire out of coil end turns 187 and 189 when the catchers 228 tug on leads 74 as the leads are transferred from stator pallet 90 to the lead trimming and cutting assembly 204.

A driving motor 210 is provided for rotating lead catchers 228. Motor 210 is mounted on support plate 222 which is movable in the upward and downward directions and which is driven by a power cylinder 218 and guided by bearing 220. Guide rods 224 are provided for supporting and guiding the movements of support plate 222. Stationary lead trimming assembly 204 is supported by frame 200 and includes a wire cutter 216 which is of conventional construction and does not form a part of the present invention.

Figure 16:
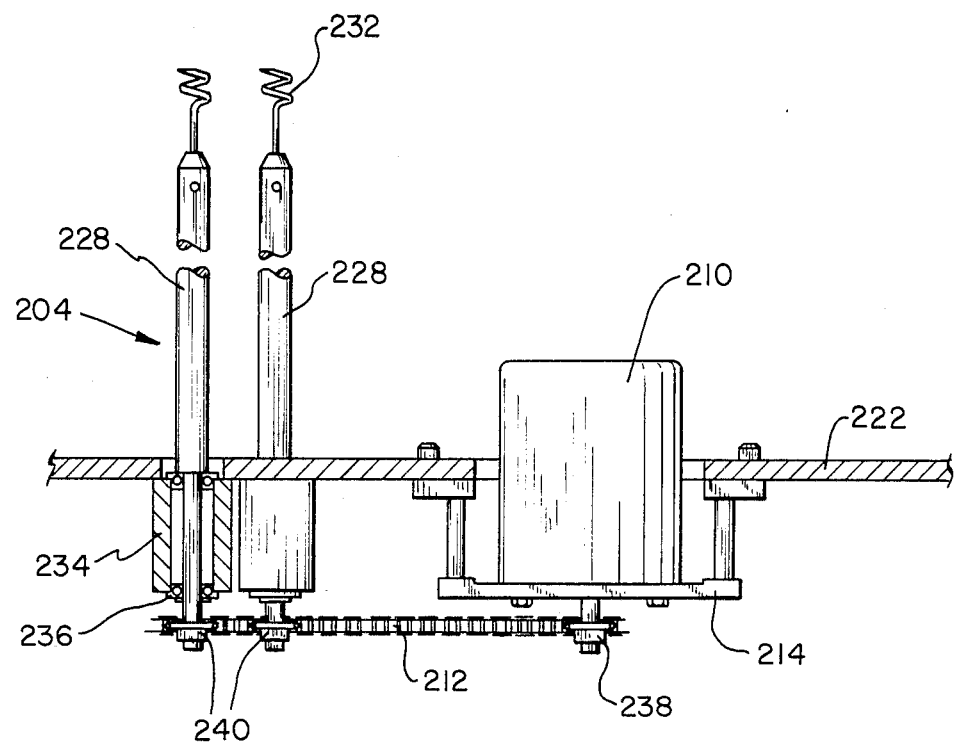
FIG. 16 is a broken-away elevational view of the lead catcher assembly and the driving assembly therefor.

As best seen in FIGS. 14 and 15, lead catcher 228 includes an elongated body 230 and has a wire spiral 232 at one end thereof. The spiral may be secured to elongated body 230 by means of a pin 231, by means of a force fit or any other suitable means. Spiral 232 has a greater outside diameter than the inside diameter of lead retaining apertures 104 of stator pallet 90. As best seen in FIG. 16 motor 210 rotatably drives a sprocket 238 for driving a chain 212 which in turn is drivingly engaged with sprockets 240 located at respective end portions of lead catchers 228. Lead catchers 228 are journalled in bearings 236 which are mounted in bearing housings 234. In a preferred embodiment motor 210 rotates catchers 228 at approximately 50 rpm but such speed may be adjusted as desired. It should also be noted that motor 210 and chain 212 may drive any number of lead catchers 228 as desired and may also rotate catchers 228 in opposite directions as desired.

Figure 17:
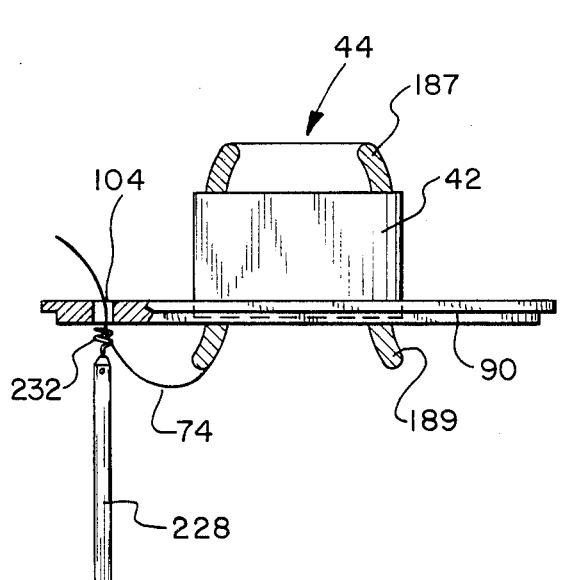
FIG. 17 is an enlarged broken-away elevational view, partly in cross-section, of the stator pallet and lead catcher assembly during transfer of the leads from the stator pallet lead retaining apertures to the lead finishing assembly.

In operation, as best seen in FIGS. 13, 16 and 17, after stator pallet 90 is moved into position in the coil lead trimming and finishing apparatus, support plate 222 is moved upwardly so that spirals 232 of catchers 228 are flush with the lower surface 242 of pallet 90. Since spirals 232 are larger than apertures 104 they cannot enter apertures 104. Motor 210 is now energized so that catchers 228 will be rotated. While in the illustrated embodiment catchers 228 will rotate in the clockwise direction it can be readily understood that catchers 228 may be rotated in the opposite direction. However, if catchers 128 are to be rotated in the opposite direction, spirals 232 would need to be threaded in the opposite direction to capture leads 74. As spirals 232 rotate, leads 74 in apertures 104 of pallet 90 will be threaded into spirals 232. Spirals 232 are now retracted so that leads 74 will be pulled out of retaining apertures 104. When lead catchers 228 are now retracted downwardly by cylinder 218, they will pass through aligned apertures in lead trimming assembly 204 so that leads 74 are laced through lead trimming assembly 204. At this point a lead cutter trims leads 74 to the proper length. It should also be understood that other operations may be performed on the leads when positioned by catchers 228 such as lead finishing operations.

In the disclosed embodiment of FIGS. 13 and 16 only two lead catchers 228 are shown. However, it should be understood that more or fewer lead catchers 228 may be used depending upon the number of leads 74 which must be handled. Furthermore, in the illustrated embodiment each lead catcher 228 handles only a single lead 74. However, it should be understood that this is illustrative only and that each lead catcher 228 may handle several leads 74 simultaneously.

It should also be understood that lead catchers 228 are arranged to align with lead retaining apertures 104 in pallet 90. Therefore if a plurality of lead catchers 228 were to be used they would be arranged in a circular pattern in alignment with lead retaining apertures 104 as best illustrated in FIGS. 2 and 3.

In the disclosed preferred embodiment coil leads 74 have been laced through pallet 90 from the bottom surface thereof upwardly. However, it can be readily understood that the arrangement of the lead transferring assembly could be inverted so that the lacing operation would be in the opposite direction namely from the top surface of pallet 90 to the bottom surface thereof. Furthermore, the lead cutting and trimming assembly 204 may be arranged above stator pallet 90 whereby leads 74 would be cut and trimmed while they are laced upwardly through the stator pallet retaining apertures 104 rather than after leads 74 are transferred therefrom.

It should also be understood that while a spiral catcher arrangement 228 has been shown, other arrangements for capturing leads 74 and transferring them from the pallet to a lead cutting and trimming assembly 204 may be substituted therefor.

While this invention has been described as having a preferred design it will be understood that it is capable of further modification.

This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. In an apparatus for inserting prewound coils into the coils of a stator core, said slots including at least one coil terminating wire lead, said apparatus including coil insertion means for inserting said coils into said stator core and means for supporting a stator, an assembly for transferring said lead from a predetermined position on said insertion means to a retaining means in said stator core support means, said assembly comprising:
    means operatively associated with said insertion means for positioning said lead prior to insertion of said coils into a stator core; and
    means for transferring said lead from said positioning means to said retaining means.

2. The apparatus according to claim 1 wherein said stator core support means comprises a pallet and said retaining means comprises an aperture in said pallet.

3. The apparatus according to claim 1 wherein said positioning means comprises a body member secured to said insertion means, and including a wire holding slot therein.

4. The apparatus according to claim 1 wherein said positioning means comprises an elongated body, one end of said body secured to said insertion means, the other end of said body including a first elongated wire holding slot orientated in parallel to the axis of said body, and a second slot oriented transversely to said first slot and in communication therewith.

5. The apparatus according to claim 1, wherein said transferring means comprises an axially movable body member and including a lead grasping means thereon for grasping a lead held in said positioning means and for transferring said lead to said retaining means.

6. The apparatus according to claim 1 wherein said transferring means comprises an elongated body having jaw means at one end thereof for gripping said lead, said body movable to a first position wherein said jaw means is positioned to grip said lead from said positioning means, and to a second position wherein said lead is laced through said lead retaining aperture in said pallet and to a third position wherein said jaw releases said lead whereby said lead is retained in said retaining aperture.

7. The apparatus according to claim 1 wherein said transferring means comprises an elongated body including jaw means at one end thereof for gripping a lead, said jaw means including first and second stationary jaw members forming a slot therebetween, and a pivoting jaw member pivotably mounted on a first of said stationary members and urged by a spring member toward a closed position wherein said pivoting jaw member closes off said slot thereby forming an aperture in said jaw for retaining a said lead, said elongated body axially translatable to a first position wherein said jaw means grips said lead from said positioning means and to a second position wherein said lead is released from said jaw means, said elongated body axially traversing said retaining aperture in said pallet during its translational movement from said first position to said second position whereby said lead is laced through said aperture and retained therein after release from said jaw means.

8. The apparatus according to claim 7 wherein the walls of said slot diverge outwardly toward the end of said body for guiding a lead inwardly into said slot when a wire enters said slot, and wherein the inner surface of said pivoting jaw member which faces the inner surface of said second stationary jaw member is inclined inwardly toward said facing inner surface and forms an acute angle therewith for guiding said lead into said slot.

9. The apparatus according to claim 2 wherein said transferring means comprises an elongated body secured to an upper portion of said apparatus, said pallet positioned between a first position of said elongated body and said positioning means, said elongated body aligned with said retaining aperture in said pallet and said positioning means, said elongated body including lead gripping means at one end thereof and being axially movable between said first position and a second position wherein said gripping means is disposed adjacent said positioning means to grip said positioned lead, said elongated body being movable from said second to said first position to lace said lead through said aperture and thereafter to release said lead from said lead gripping means.

10. The apparatus according to claim 2 wherein said placer tooling includes cuff support means comprising a plurality of cuff support fingers for supporting slot liner cuffs during insertion of said coils into said slots, said retaining means arranged radially outwardly of and aligned with the core slot whereinto said lead is to be inserted, whereby said retained lead is arranged radially between said cuff support fingers without crossing said cuffs or said cuff support fingers.

11. The apparatus according to claim 10 wherein said cuff support fingers which are disposed adjacent said retaining apertures include recessed portions in the opposed faces thereof thereby forming an aperture which is aligned with said retaining aperture.

12. In a apparatus for inserting prewound coils into the slots of a stator core of a dynamoelectric machine, said coils including a plurality of terminating wire leads, said apparatus including coil inserting means for inserting coils into said stator core slots and for receiving coils from a coil winding form, said inserting means including inserting blades and a stripper means for stripping coils from said blades and inserting said coils into said slots;
    an assembly for retaining coil leads in predetermined positions on said inserting means comprising a wire holding member including a slot means for releasably retaining said leads therein;
    a stator supporting assembly including lead retaining apertures which are axially aligned with said holding members; and
    a lead transfer assembly comprising means for gripping said leads retained in said slot means and for lacing said leads through said lead retaining apertures.

13. The apparatus according to claim 12 wherein said transferring means comprises a movable body member secured to said apparatus and including lead grasping means thereon for grasping a lead held in said positioning means and for transferring said lead to said retaining aperture.

14. The apparatus according to claim 12 wherein said transferring means comprises an elongated body including jaw means for gripping said lead, said body being movable to a first position wherein said jaw means is adjacent said positioning means and grips said lead, and to a second position wherein said lead is laced through said lead retaining apertures in said pallet and a third position wherein said jaw releases said lead whereby said lead is retained in said retaining apertures.

15. The apparatus according to claim 12 wherein said transferring means comprises an elongated body including jaw means at one end thereof for gripping a lead, said jaw means including first and second stationary jaw members forming a slot therebetween, a pivoting jaw member pivotably mounted on a first of said stationary members and urged by a spring member toward a closed position wherein said pivoting jaw member closes off said slot thereby forming an aperture in said jaw for retaining said lead, said elongated body being axially translatable to a first position wherein said jaw means grips a lead from said positioning means and to a second position wherein said lead is released from said jaw means, said body traversing said retaining aperture in said pallet during its translational movement from said first to said second position whereby said lead is laced through said aperture and retained therein.

16. The apparatus according to claim 15 wherein the walls of said slot converge inwardly from the outer end of said body into said slot for guiding a lead inwardly into said slot and wherein the inner surface of said pivoting jaw member which faces the inner surface of said second stationary jaw member is inclined inwardly toward said facing inner surface and forms an acute angle therewith for guiding said lead into said slot.

17. The apparatus according to claim 12 wherein said transferring means comprises an elongated body secured to an upper portion of said apparatus, said pallet positioned between a first position of said elongated body and said positioning means, said elongated body aligned with a retaining aperture in said pallet and said positioning means, said elongated body including lead gripping means at one end thereof and being axially movable between said first position and a second position wherein said gripping means is disposed adjacent said positioning means to grip said positioned lead, said elongated body being movable from said second position to said first position to lace said lead through said aperture and thereafter to release said lead from said lead gripping means.

18. In an apparatus for inserting prewound coils into the slots of a stator core of a dynamoelectric machine, said coils including a plurality of terminating wire end leads, said apparatus including coil inserting means for inserting said coils into said stator core slots and for receiving prewound coils and for inserting said coils into said stator core, an assembly for positioning and transferring said end leads comprising:
    stator core tray means for supporting a stator core and including means for releasably retaining said coil leads;
    means operably associated with said inserting means for receiving and retaining said leads in predetermined positions prior to insertion of said coils into said stator core slots;

means for transferring said leads from said predetermined positions to said stator core tray lead retaining means during insertion of said coils into said stator core slots; and means for transferring said leads from said stator core tray retaining means to coil lead processing means.

19. The apparatus according to claim 18 wherein said lead retaining means in said stator core tray means comprises a plurality of apertures.

20. The apparatus according to claim 18 wherein said positioning means comprises an elongated body, one end of said body being secured to said inserting means, the other end of said body including a first elongated wire holding slot axially aligned with said body and a second slot oriented transversely with respect to said first slot and in communication therewith and with an outer surface of said body.

21. The apparatus according to claim 18 wherein said transferring means comprises an elongated body having jaw means at one end thereof for gripping a said lead, said body being movable to a first position wherein said jaw means is adjacent said positioning means for gripping said lead, and to a second position whereby said lead is laced through said lead retaining apertures in said pallet and a third position wherein said jaw releases said lead whereby said lead is retained in said retaining aperture.

22. The apparatus according to claim 18 wherein said transferring means comprises an elongated body including jaw means at one end thereof for gripping a lead, said jaw means including first and second stationary jaw members forming a slot therebetween and a pivoting jaw member pivotably mounted on a first of said stationary members and urged by a spring member toward a closed position wherein said pivoting jaw member closes said slot and thereby forming an aperture in said jaw for retaining a lead, said elongated body being axially translatable to a first position wherein said jaw means receives a lead from said positioning means and to a second position wherein said lead is released from said jaw means, said body moving through said retaining aperture in said pallet during its translational movement from said first of said second position whereby said lead is laced through said aperture and retained therein.

23. The apparatus according to claim 18 wherein said means for transferring said leads from said stator core tray comprises an elongated body including a spiral means at one end thereof for catching said leads.

24. The apparatus according to claim 23 wherein said elongated body is rotatable and includes means for rotatingly driving said body.

25. The apparatus according to claim 23 wherein said elongated body includes a sprocket at the other end thereof, said apparatus including a chain engaged with said sprocket and a motor drivingly engaging said chain for rotating said elongated body and spiral means.

26. The apparatus according to claim 18 and including plug means for retaining said coils in their inserted positions during said lead catching and transferring operations.

27. The apparatus according to claim 18 wherein said plug means is conical and is movable for moving into the bore of said stator, whereby said plug presses radially outwardly on the end turns of said stator during said lead catching and transferring operations.

28. A method for transferring coil leads from predetermined positions in a coil inserting apparatus to retaining devices located on a stator carrying pallet, said coil inserting apparatus including coil inserting means for inserting coils into a stator core having an array of coil inserting blades and a stripper, the method comprising the steps of:

supporting prewound coils on said blade array and positioning said leads into predetermined positions on said inserting means;

moving said blades into their coil inserting positions;

advancing said stripper through said array of blades and stripping the coils into predetermined slots of said core;

gripping said leads and transferring said leads to said retaining devices after said coils have entered said slots and prior to the retraction of said stripper and said blades to their preinserting positions.

29. The method according to claim 28 wherein said leads are transferred when said stripper is at the top of its stroke, after said coils are fully inserted into said core slots and before said blades are retracted from their coil inserting positions.

30. The method according to claim 28 wherein the means for gripping and transferring said leads comprises at least one elongated body including a jaw at one end thereof, said retaining devices comprising apertures in said pallet, said gripping and transferring step including the steps of:

moving said elongated body and said jaw from a rest position through one of said apertures in said pallet;

aligning said jaw with one of said leads which is disposed in one of said predetermined positions;

gripping said lead; and retracting said body through said aperture to said rest position whereby said lead is laced through said aperture.

31. The method according to claim 28 wherein said core and said pallet with said leads retained in said pallet retaining devices are transported through successive coil inserting and coil finishing operations while said leads are retained in said retaining devices.

32. The method according to claim 28 including the steps of inserting a second set of coils in said stator core and positioning and retaining the leads of said second set of coils in retaining devices on said pallet.

33. A method for positioning and transferring the leads of prewound coils in a coil inserting apparatus, said apparatus including a blade support and an array of inserting blades mounted thereon, a stripper, lead holders secured to said blade support for holding coil leads in predetermined positions, a stator support tray including lead retaining apertures therein, said apertures being aligned with said holders, lead pullers for gripping and pulling said leads through said lead apertures, said pullers being aligned with said apertures and holders, the method comprising the steps of:

placing the prewound coils on said blade array;

positioning the coil leads in said holders;

lowering said lead pullers through said apertures;

positioning said pullers adjacent said holders and gripping said positioned leads therewith;

retracting said pullers with said gripped leads through said apertures and thereby lacing said leads through said apertures;

returning said pullers to their rest positions to enable said leads to be released from said pullers;

moving said pallet including said retained leads to a subsequent station for further operations.

34. The method according to claim 33 wherein said leads are transferred when said stripper is at the top of its stroke, after said coils are inserted in said slots and before said blades are retracted from said inserting positions.

35. The method according to claim 33 wherein the means for gripping and transferring said leads of said apparatus comprises at least one elongated body including a jaw at one end thereof and said gripping step includes the steps of moving said elongated body and said jaw from a rest position through one of said apertures, aligning said jaw with one of said leads and gripping said lead, and retracting said body to said rest position through said aperture whereby said lead is laced through said aperture and releasing said lead from said jaw.

* * * * *

UNITED STATES PATENT AND TRADEMARK OFFICE
CERTIFICATE OF CORRECTION

PATENT NO. : 4,648,176
DATED : March 10, 1987
INVENTOR(S) : Keith Moser    I-033

It is certified that error appears in the above-identified patent and that said Letters Patent is hereby corrected as shown below:

Claim 1, Col. 14, line 18, change "coils" to --slots--;
Claim 1, Col. 14, line 18, change "slots" to --coils--.

Signed and Sealed this

Thirteenth Day of October, 1987

*Attest:*

DONALD J. QUIGG

*Attesting Officer*     *Commissioner of Patents and Trademarks*